(12) United States Patent
Sabin

(10) Patent No.: US 9,894,098 B2
(45) Date of Patent: *Feb. 13, 2018

(54) CLOUD PROTECTION TECHNIQUES

(71) Applicant: Novell, Inc., Provo, UT (US)

(72) Inventor: Jason Allen Sabin, Lehi, UT (US)

(73) Assignee: Micro Focus Software Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,794

(22) Filed: Jul. 21, 2014

(65) Prior Publication Data
US 2014/0359769 A1    Dec. 4, 2014

Related U.S. Application Data

(63) Continuation of application No. 13/284,194, filed on Oct. 28, 2011, now Pat. No. 8,789,179.

(51) Int. Cl.
*H04L 9/00* (2006.01)
*H04L 29/06* (2006.01)
*G06F 21/55* (2013.01)
*G06F 21/56* (2013.01)

(52) U.S. Cl.
CPC ......... *H04L 63/1491* (2013.01); *G06F 21/55* (2013.01); *G06F 21/554* (2013.01); *H04L 63/20* (2013.01); *G06F 21/56* (2013.01); *G06F 21/566* (2013.01); *G06F 2221/2123* (2013.01); *H04L 63/14* (2013.01)

(58) Field of Classification Search
CPC ..................................................... G06F 21/55
See application file for complete search history.

(56) References Cited

U.S. PATENT DOCUMENTS

| | | |
|---|---|---|
| 7,131,142 B1 | 10/2006 | Kay |
| 7,383,578 B2 | 6/2008 | Blake et al. |
| 7,412,723 B2 | 8/2008 | Blake et al. |
| 7,689,835 B2 | 3/2010 | Palliyil et al. |
| 7,908,656 B1 | 3/2011 | Mu |
| 8,789,179 B2 | 7/2014 | Sabin |

(Continued)

OTHER PUBLICATIONS

Scarfone, Karen, et al., "Guide to Intrusion Detection and Prevention Systems (IDPS)", National Institute of Standards and Technology Special Publication No. 800-94, http://csrc.nist.gov/publications/nistpubs/800-94/SP800-94.pdf, (Feb. 2007).

(Continued)

*Primary Examiner* — Josnel Jeudy
(74) *Attorney, Agent, or Firm* — Schwegman Lundberg & Woessner, P.A.

(57) ABSTRACT

Cloud protection techniques are provided. A security breach is detected in a source cloud environment. An enterprise system processing in the source cloud environment is immediately locked down and is dynamically migrated to a target cloud environment. While the enterprise system is migrating, the source cloud environment creates a fake environment with fake resources within the source cloud environment to dupe an intruder having access as a result of the security breach. Metrics and logs are gathered with respect to activities of the intruder within the source cloud environment.

17 Claims, 4 Drawing Sheets

(56) References Cited

U.S. PATENT DOCUMENTS

| | | |
|---|---|---|
| 2002/0162017 A1* | 10/2002 | Sorkin ............... H04L 63/0227 |
| | | 726/4 |
| 2003/0055928 A1 | 3/2003 | Machida |
| 2003/0115256 A1 | 6/2003 | Brockway et al. |
| 2004/0078592 A1 | 4/2004 | Fagone et al. |
| 2005/0102538 A1 | 5/2005 | Hunt et al. |
| 2005/0166072 A1 | 7/2005 | Converse et al. |
| 2006/0101515 A1* | 5/2006 | Amoroso ............ H04L 12/2602 |
| | | 726/23 |
| 2007/0118908 A1* | 5/2007 | Brown et al. .................. 726/23 |
| 2009/0006856 A1 | 1/2009 | Abraham et al. |
| 2010/0313256 A1 | 12/2010 | Sekiguchi et al. |
| 2013/0036218 A1 | 2/2013 | Campagnoni |
| 2013/0111540 A1 | 5/2013 | Sabin |

OTHER PUBLICATIONS

Shakleford, Dave, et al., "WebCasts SANS: Detecting Advanced Threats and Malware with SIEM", The SANS institute—www.sans.org, http://www2.nitrosecurity.com/SIEM/assets/File/webcasts/08122010_webcast/Detecting_Adv_Threats.pdf, (2010), 1-60.

* cited by examiner

CLOUD PROTECTION TECHNIQUES

PRIORITY APPLICATION

This application is a continuation of U.S. application Ser. No. 13/284,194, filed Oct. 28, 2011, now issued as U.S. Pat. No. 8,789,179, which is incorporated herein by reference in its entirety.

BACKGROUND

Increasingly, the physical location and management of physical and logical (software) assets for an enterprise are being outsourced to what is referred to in the industry as cloud environments. The ability to outsource the management and support of both physical and logical assets has a tremendous upside to enterprises.

For example, an enterprise's main expertise may be in retail goods sold to consumers. Such an enterprise, over time, builds a substantial in-house Information Technology (IT) group that encompasses skilled technicians and even highly educated developers. The reason for this is that nearly every aspect of today's enterprises includes technology. So, the example enterprise needs to maintain systems for a variety of enterprise assets including such things as Human Resources, Employees, and Customers (that access the enterprise via online stores or that has loyalty accounts, etc. with the enterprise).

This is but a small sample of what such an enterprise may need in terms of technology. Technology also becomes outdated and requires migration to newer systems and/or hardware. All of these activities distract the enterprise away from its core focus, which is retailing. However, some of these activities may actually improve its core business when it if customer-facing, such as customer-relationship management activities.

Within no time a retail enterprise starts to have an IT department and physical assets that dwarf the size and assets of other internal departments.

With cloud technology, the example enterprise can outsource much, but probably not all, of the IT department and the physical and logical assets.

One major drawback to an enterprise's willingness to migrate to a cloud environment is security. It seems nearly every day that some cloud or enterprise system is compromised and consumers are alerted. Security can be related to disclosure of confidential information, such as social security numbers, or can be related to access availability, such as when a virus takes down a cloud environment and makes services unavailable.

SUMMARY

Various embodiments of the invention provide cloud protection techniques. Specifically, a method for cloud protection is presented.

A security intrusion is detected within a source cloud environment and a cloud protection agent is instructed to shut down an enterprise system operating within the source cloud environment. Next, the enterprise system is migrated from the source cloud environment to a target cloud environment once the cloud protection agent indicates resources of the enterprise system are ready for migration. While the migration proceeds a feigned enterprise system is created within the source cloud environment to entice an intruder within the source cloud environment to take actions that are then monitored, the intruder caused the security intrusion.

DETAILED DESCRIPTION

Figure 1:
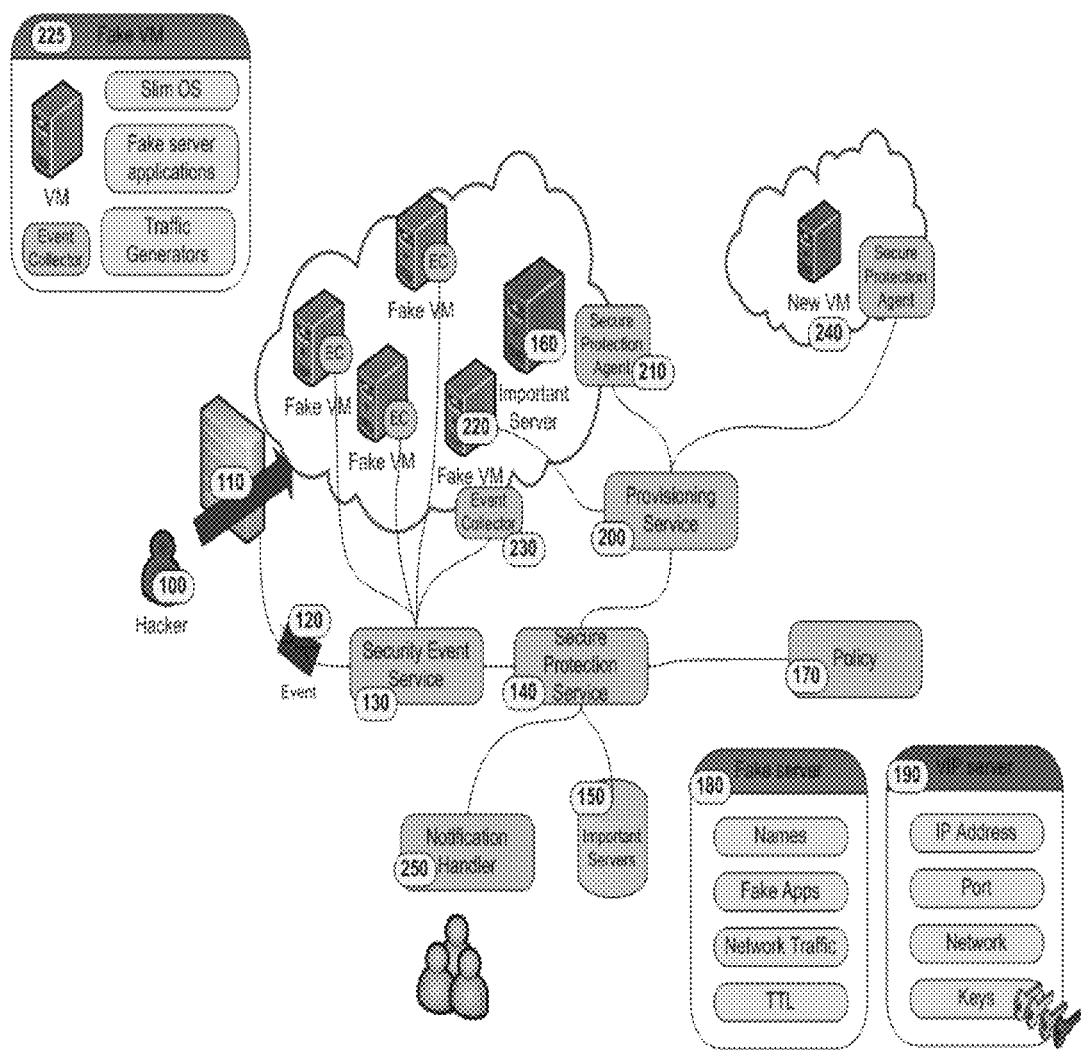
FIG. 1 is a diagram of an example architecture for cloud protection, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, proxy products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example architecture for cloud protection, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that a cloud environment may encounter. These are presented for purposes of illustration only as other situations can occur as well and still benefit from the techniques presented herein and below.

Starting at 100, a malicious hacker attempts to break into a network or a cloud (private cloud, public cloud, or hybrid cloud (public and private)).

So, at 110, the hacker breaches the firewall, but the firewall has detected a possible intrusion and sends off a security event at 120. This event does not have to be a firewall event; the event can be any type of detectable and trapped security event. So, the event can be a security event from some server on the network or anywhere else in close proximity on any server, device, or application.

The security event, at 120, is sent to a Security Event Service, at 130. In some cases, this can be any type of Security Information and Event Management (SIEM) service. The Security Event Service elevates the threat risk level of the network or cloud for all the servers running or possible nearby locations where the security event occurred from. If the threat is high enough (determined via comparisons to preconfigured thresholds or policies) or some other correlation (preconfigured condition) has occurred then the Security Event Service notifies the Secure Protection Service (SPS) at 140 of the problem.

The SPS has a listing of all important servers (150), which networks, locations they reside on, and other data listing information. The Secure Protection Service has determined that the Important Server (enterprise system), at 160, needs to be moved to another location because of the elevated risk and the security event that has occurred.

The SPS now consults policy, at 170; to determine what actions needs to be performed. Policy defines what the "screen" (fake environment and fake resources) will look like and all the parameters needed to perform the "screen" (process the fake environment). Policy also defines what re-provisioning on all the new important servers (new or target cloud environment) will look like. There can be various parameter differences depending on the type of security threat and how important the server is or how critical the information being protected is.

Policy evaluation has now determined that fake servers need to be implemented to screen (fake) the important server. At 180, some of the parameters that can be used for the screen are presented for purposes of illustration. These sample parameters include: Domain Name System (DNS) names, fake applications (type of logical resources) that appear to be running, type and amount of network traffic to generate, and how long these fake servers are to be running (Time-To-Live (TTL)). This can also include how many fake servers need to be setup for the dupe to take place against the intruder.

Policy has also determined that the important servers need to be re-provisioned to a new location (target cloud environment). At 190, some example parameters are shown for the migration of the important server (enterprise system) to the target cloud environment. This includes, by way of example only, the new network or cloud identifier (target cloud environment identifier), new Internet Protocol (IP) address, new communication port identifiers, and possibly even new keys associated with this new provisioned Virtual Machine (target cloud environment—keys for authentication, encryption, and the like). This information is basically everything needed to define where the new important server (enterprise system) is going to be moved to.

Now that all the information has been determined on what to do, the SPS contacts the provisioning server at 200. The SPS instructs the provisioning service where to re-provision the important server to. The SPS also tells the provisioning service how many and where to provision the fake VM's (fake source cloud environment/fake important server).

The Provisioning Service contacts a Secure Protection Agent (SPA), at 210, to inform the SPA that it needs to shut down all applications and be ready for re-provisioning. The SPA knows that it needs to immediately shut down all current connections and lock down the machine (enterprise system—virtual machine, source cloud environment—legitimate important service). The SPA then shuts down itself so it can be re-provisioned in the new target cloud environment (target VM, target instance of the important server). Optionally, the SPS can contact the SPA directly to perform this and the Provisioning Service can be used just to move the actual VM.

The Provisioning Service now clones the Fake VM's that are going to be used as a screen (220). The provisioning service clones new VM's from templates. The templates can be pre-programmed and configured for all the possible options (think multiple Virtual Appliances) in the Policy and Fake VMs' parameters (180). This is generally the quickest and fastest way to immediately bring up the fake VMs. The fake VMs can also be cloned from a couple templates and there can be an agent on the fake VM that self configures to all the parameters decided upon by various policy decisions.

An example definition of what the fake VM looks like is presented at 225. A fake VM essentially includes of a very slim Operating System (OS) or just enough OS (JeOS). The fake VM has some fake server applications running on it. For example, these fake server applications can be nothing more than a tiny application running on communication port 80 that appears to look like a vulnerable apache server, but in reality it is just sending traffic to "/dev/null" or sending traffic to a log file to track the activity with the intruder. The fake VM can also include traffic generators to make it appear like traffic is traveling between the various fake VM's. The fake VM also includes an event collector. T his event collector is used to track any possible valuable information about the hacker/intruder. A fake VM setup in this way is similar to honey pot systems that companies use to lure hackers to. A honey pot system is used to try and collect information about a hacker. As described herein, fake VM's are used as honey pot systems to not only try and collect information, but also as a distraction to try and attract the hacker to these systems, all while the important server (enterprise system) is being migrated to other more secure locations (target VMs, target cloud environment, etc.).

Each of the fake VM's Event Collectors (EC) is configured to send its events to the SIEM or Security Event Service. All this information can later be used to correlate what the hacker/intruder is doing within the network or cloud.

Meanwhile, the Provisioning Service has moved the Important Server at 160 to a new secure location at 240. This can be another network, another private cloud location, or even an entirely new cloud provider. The new cloud can have new IP addresses, new ports that the services are running on, and/or even new encryption or signing keys.

Finally, once the Important Server VM has been moved the SPS notifies all important administrators and users of the migration to the new location and what has happened (250).

Companies are very worried about putting critical or confidential information, applications, and services into clouds, especially public clouds. Using techniques presented herein, the approaches can provide additional security protection to these important and critical servers of enterprises and help alleviate the worry of customers when migrating their systems to the cloud.

Figure 2:
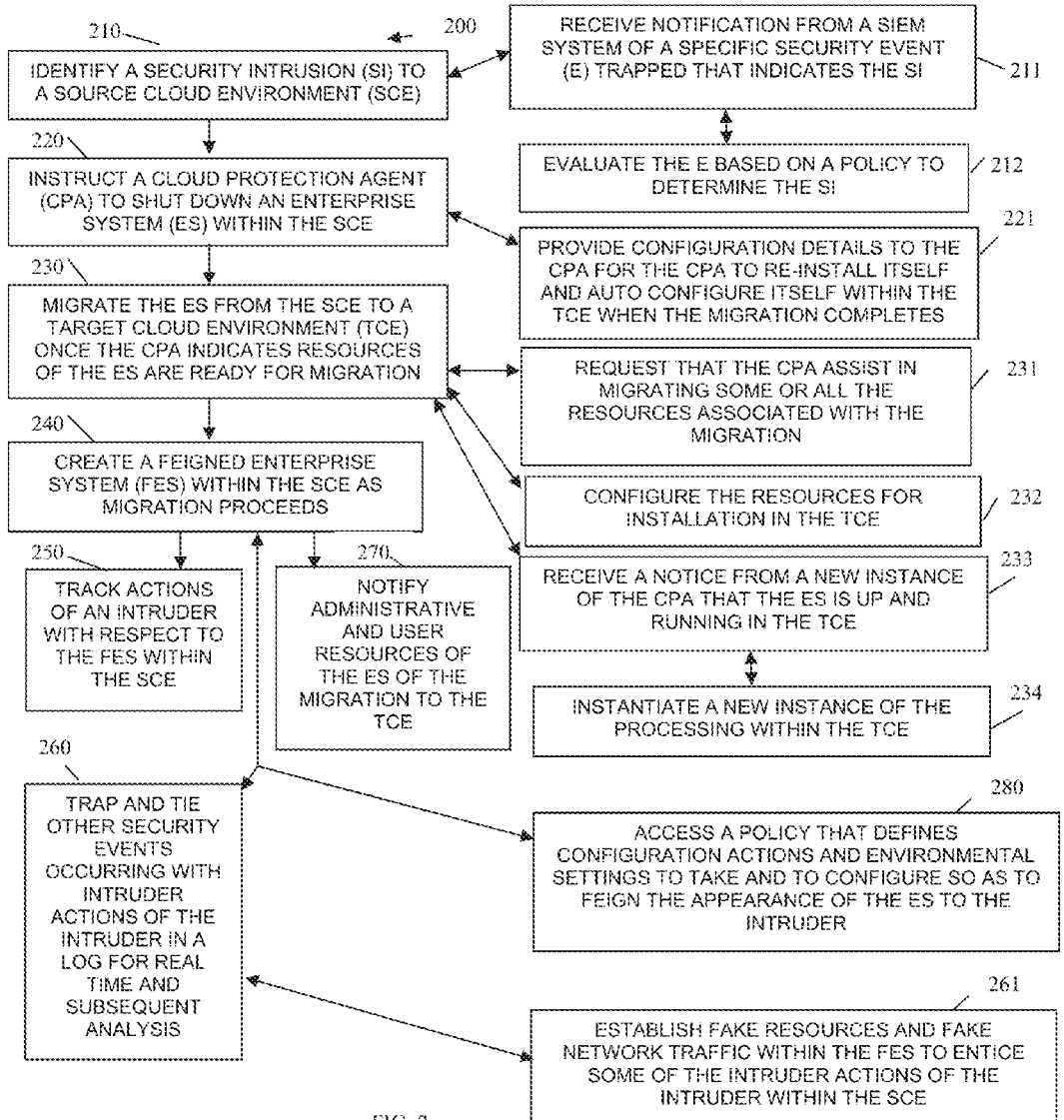
FIG. 2 is a diagram of method for cloud protection, according to an example embodiment.
Figure 3:
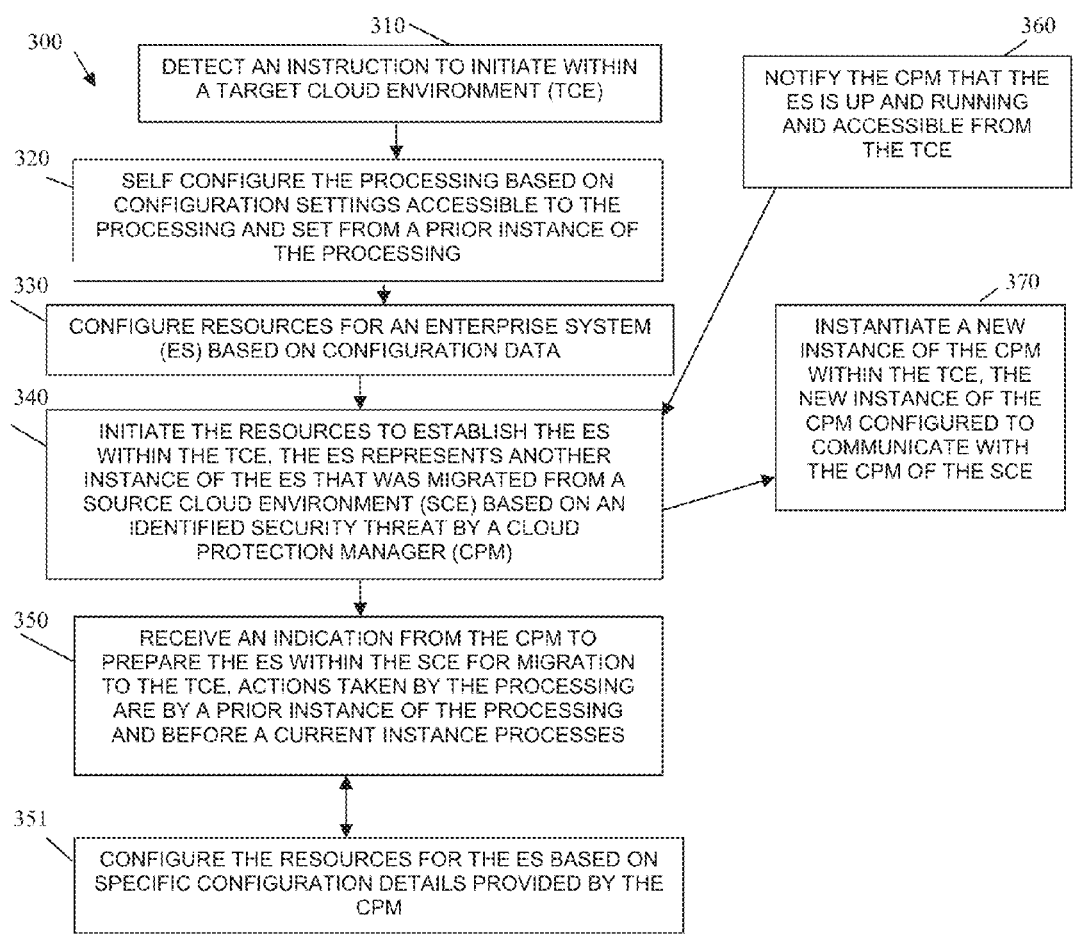
FIG. 3 is a diagram of another method for cloud protection, according to an example embodiment.
Figure 4:
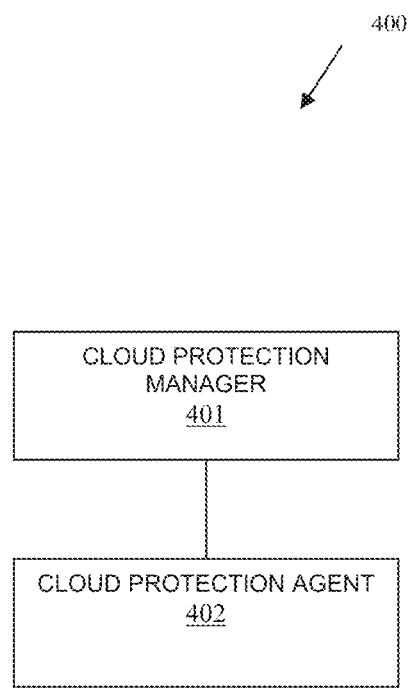
FIG. 4 is a diagram of a cloud protection system, according to the techniques presented herein.

The remaining FIGS. 2-4 now provide specific embodiments of the overall techniques discussed above with reference to the FIG. 1.

FIG. 2 is a diagram of method 200 for cloud protection, according to an example embodiment. The method 200 (hereinafter "cloud protection manager") is implemented and resides within a non-transitory computer-readable or processor-readable medium that executes on one or more processors of a network. Moreover, the cloud protection manager is operational over a network and the network may be wired, wireless, or a combination of wired and wireless.

At 210, the cloud protection manager identifies a security intrusion to a source cloud environment. The source cloud environment may be viewed as one or more VMs processing within a networked environment. The cloud protection manager processes within the source cloud environment. The security intrusion can be detected in a variety of manners, such as those discussed above with reference to the discussion of the FIG. 1.

For example, at 211, the cloud protection manager receives a notification from a SIEM system/service that is operable within or interfaced to the source cloud environment. This identifies a specific security event trapped and is used for identifying the security intrusion.

Continuing with the embodiment of 211 and at 212, the cloud protection manager evaluates the specific security event based on a policy that is evaluated to determine the security intrusion. Policies can be dynamically acquired, installed and evaluated, such that security intrusion can be evolving and time-sensitive.

At 220, the cloud protection manager instructs a cloud protection agent to shut down an enterprise system within the source cloud environment. As used herein an "enterprise system" may be viewed as one or more VMs that are processing within the source cloud environment. It is also noted that any particular enterprise system can include resources from multiple different enterprises. So, enterprise system is used to identify a set of resources within the source cloud environment that are at risk due to the security intrusion. It is also noted that the cloud protection agent also shuts itself down after the other resources are blocked and configured and shut down for migration to the target cloud environment.

According to an embodiment, at 221, the cloud protection manager provides configuration details to the cloud protection agent for the cloud protection agent to re-install an instance of itself and auto configure itself within the target cloud environment when the migration completes and is initiated for installation on the target cloud environment. Some example configuration details were provided above with the discussion of the FIG. 1.

At 230, the cloud protection manager migrates the enterprise system from the source cloud environment to a target cloud environment. This occurs once the cloud protection agent indicates resources of the enterprise system are ready for migration to the target cloud environment.

In an embodiment, at 231, the cloud protection manager requests that the cloud protection agent assist in migrating some or all of the resources associated with the migration. So, the migration entity can be the cloud protection agent, the cloud protection manager, or a combination of both these entities.

In another situation, at 232, the cloud protection manager configures the resources for installation in the target cloud environment. That is, metadata associated with the resources or profiles can be altered once each resource is shut down within the source cloud environment, such that when the resources are reinitiated within the target cloud environment those resources are ready for installation.

In still another case, at 233, the cloud protection manager receives a notice from a new instance of the cloud protection agent that the enterprise system is up and running in the target cloud environment.

Continuing with the embodiment of 233 and at 234, the cloud protection manager instantiates a new instance of the cloud protection manager within the target cloud environment. Such that all the processing discussed heretofore is available and active within the target cloud environment after migration completes.

At 240, the cloud protection manager creates a feigned enterprise system within the source cloud environment as the migration proceeds. That is, the processing of 240 occurs concurrently and in parallel with the processing of 230-234. Essentially, this is done to stall the intruder while migration occurs unknown to the intruder. The feigned enterprise system is fake and partially operational enterprise system that is used to dupe the intruder and to track actions of the intruder to determine what the intruder is doing, who the intruder is, where the intruder came from, and perhaps how the intruder penetrated the source cloud environment in the first instance.

According to an embodiment, at 250, the cloud protection manager tracks actions of an intruder with respect to the feigned enterprise system within the source cloud environment.

In another scenario, at 260, the cloud protection manager traps and ties other security events occurring with intruder actions of the intruder in a log or database for real-time and subsequent batch analysis.

Continuing with the embodiment of 260 and at 261, the cloud protection manager establishes fake resources and fake network traffic within the feigned enterprise system to entice some of the intruder actions of the intruder within the source cloud environment. This is a honey pot system to attract certain actions of the intruder; some of the actions can be designed to gather details about the intruder.

According to an embodiment, at 270, the cloud protection manager notifies administrative and user resources of the enterprise system migration to the target cloud environment. This can occur via any type of channel and can be directed to both automated (programs and services) resources and manual resources (human resources via instant messaging, text messaging, emails, and the like).

In yet another case, at 280, the cloud protection manager access a policy that defines specific configuration actions and environmental settings to take and to configure so as to feign the appearance of the enterprise system to the intruder.

FIG. 3 is a diagram of another method 300 for cloud protection, according to an example embodiment. The method 300 (hereinafter "cloud protection agent") is implemented and resides within a non-transitory computer-readable or processor-readable medium that executes on one or more processors of a network. Moreover, the cloud protection agent is operational over a network and the network may be wired, wireless, or a combination of wired and wireless.

The cloud protection agent provides processing from the perspective of a new cloud processing environment for an enterprise system that is instantiated and/or migrated by the cloud protection manager represented by the method 200 of the FIG. 2. So, in this manner the cloud protection agent interacts with and communicates with the cloud protection manager.

At 310, the cloud protection agent detects an instruction within a target cloud processing environment that initiates the cloud protection agent. This can be part of an installation package delivered to the target cloud processing environment that executes the cloud protection agent as soon as the files for an enterprise system are downloaded to the target cloud environment or until some configurable amount of the files are available on the target cloud environment based on conditions defined in the installation package. This can entirely be automated without any manual intervention whatsoever.

At 320, the cloud protection agent self configures itself based on configuration settings accessible to the processing and set from a prior instance of the cloud protection agent. That is, the cloud protection agent operates as an initial instance within the source cloud environment (the environment from which the enterprise system is migrating from) and that prior instance prepares the current instance of the cloud protection agent, discussed herein with reference to the FIG. 3.

At 330, the cloud protection agent configures resources for an enterprise system based on configuration data. Some example configuration details were provided above with reference to the FIG. 3.

At 340, the cloud protection agent initiates the resources to establish the enterprise system within the target cloud environment. The enterprise system represents another instance of the enterprise system that was migrated from a source cloud environment based on an identified security threat by a cloud protection manager. The details of this migration and the cloud protection manager's processing were presented above with reference to the FIG. 2.

According to an embodiment, at 350, the cloud protection agent receives an indication from the cloud protection manager to prepare the enterprise system within the source cloud environment for migration to the target cloud environment. These actions of 350 are taken by the initial instance cloud protection agent and a different processing instance from that which is presented at 310-340. These actions at 350 occur before the actions of 310-340.

Continuing with the embodiment of 350 and at 351, the cloud protection agent configures the resources for the enterprise system based on specific configuration details provided by the cloud protection manager.

In an embodiment, at 360, the cloud protection agent notifies the cloud protection manager that the enterprise system is up and running and is accessible from the target cloud environment. This tells the cloud protection manager that actions of the intruder within the source cloud environment can now be focused on and done so with little to no risk since the enterprise system is removed from the source cloud environment and now safely available for access within the target cloud environment.

In yet another scenario, at 370, the cloud protection agent instantiates a new instance of the cloud protection manager within the target cloud environment. The new instance of the cloud protection manager configured to communicate with the cloud protection manager of the source cloud environment. Details of the intruder and the security event that precipitated the migration of the enterprise system can also be communicated to the new instance of the cloud protection manager. Additionally, firewall security for the target cloud environment can be updated to prevent another situation where an intruder can penetrate the target cloud environment in the manner that the intruder was able to penetrate the source cloud environment. So, dynamic feedback can be provided and learned by resources of the target cloud environment so that security is continually and dynamically improved.

FIG. 4 is a diagram of a cloud protection system 400, according to the techniques presented herein. The components of the cloud protection system 400 are implemented within and reside within a non-transitory and computer or processor-readable storage medium for purposes of executing on one or more processors of a network. The network may be wired, wireless, or a combination of wired and wireless.

The cloud protection system 400 implements, inter alia, various aspects of the FIG. 1, and the methods 200 and 300 of the FIGS. 2 and 3, respectively.

The cloud protection system 400 includes a cloud protection manager 401 and a cloud protection agent 402. Each of these and their interactions with one another will be discussed in turn.

The cloud protection system 400 includes one or more processors configured with the cloud protection manager 401, which is implemented in a non-transitory computer-readable storage medium as executable instructions that process on the processor(s).

In an embodiment, the processors are a server or cloud-based set of servers for a particular source cloud environment.

Example processing associated with the cloud protection manager 401 was presented above with reference to the FIGS. 1-2.

The cloud protection manager 401 is configured to detect a security threat in a source cloud environment and to begin migration of an enterprise system to a target cloud environment. Moreover, the cloud protection manager 401 is configured to create a fake enterprise system within the source cloud environment and track actions taken by an intruder within the source cloud environment. The fake enterprise system includes fake resources and fake traffic or fake actions to entice the intruder to stick around in the source cloud environment and take the actions or specific actions that can reveal information about the intruder and the devices and resources of the intruder.

The cloud protection system 400 also includes another and different set of processors configured with the cloud protection agent 402. The cloud protection agent 402 is implemented in a non-transitory computer-readable storage medium as executable instructions that process on the processor(s).

In an embodiment, the processors are server or cloud-based set of servers for a particular target cloud environment that an enterprise system is dynamically migrating to; the enterprise system migrated from the source cloud environment that includes an operating instance of the cloud protection manager 401.

Example processing associated with the cloud protection agent 402 was presented in detail above with respect to the FIGS. 1 and 3.

The cloud protection agent 402 is configured to assist in migrating the enterprise system from the source environment and installing another instance of the enterprise system within the target cloud environment. Further, the cloud protection agent 402 is configured to notify the cloud protection manager 401 once the enterprise system is up and running within the target cloud environment.

According to an embodiment, the enterprise system is migrated as a virtual machine that processes with the target cloud environment and that was processing before migration within the source cloud environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
    creating a feigned cloud environment within a source cloud environment upon detection of an event from within the source environment, wherein creating further includes creating the feigned could environment on a set of cooperating computing resources including one or more processor-enabled and memory-enabled machines having one or more software and computing resources;
    migrating services from the source cloud environment to a target cloud environment, wherein creating and migrating further includes processing the creating of the feigned cloud environment in parallel and concurrently with processing the migrating of the services; and
    tracking activity of an intruder within the feigned cloud environment during the migration.

2. The method of claim 1, wherein creating further includes creating the feigned cloud environment based on risk level associated with the event.

3. The method of claim 1, wherein creating further includes obtaining a policy that defines screens and parameters to those screens for the feigned cloud environment.

4. The method of claim 3, wherein obtaining further includes obtaining from the policy fake resources for the feigned cloud environment.

5. The method of claim 3, wherein obtaining further includes producing, in response to the policy, the parameters as one or more of:
    fake Doman Name System names, fake application that appear to be executing in the feigned cloud environment, and fake types and amounts for network traffic to show appearing in the feigned cloud environment.

6. The method of claim 1, wherein migrating further includes obtaining a listing for the services and servers associated with the cloud processing environment.

7. The method of claim 1, wherein migrating further includes obtaining a policy that defines one or more of:
    a target cloud processing environment identifier, a new Internet Protocol (IP) address fur reaching the target cloud processing environment, new communication port identifiers for the target cloud processing environment, and new keys associated with authentication and encryption in the target cloud processing environment.

8. The method of claim 7, wherein obtaining further includes contacting a provisioning server where to provision the services to the target cloud processing environment.

9. The method of claim 1, wherein migrating further includes shutting down the services during the migration.

10. The method of claim 1, wherein tracking further includes capturing intruder events with the actions of the intruder in the feigned cloud processing environment and correlating the intruder events to resolve what the intruder is doing within the feigned cloud processing environment.

11. A method comprising:
    receiving an instruction from a source cloud processing environment to provision servers from the source cloud processing environment within a target cloud processing environment;
    shutting services down within the source cloud processing environment;
    provisioning fake services within the source cloud processing environment to make the cloud processing environment a honey pot cloud processing environment to entice intruders to access the fake services, wherein provisioning includes provisioning the honey pot cloud processing environment on a set of cooperating computing resources including one or more processor-enabled and memory-enabled machines having one or more software and computing resources; and
    migrating and provisioning the services that were shut down for execution in the target cloud processing environment, wherein provisioning and migrating further includes processing the provisioning of the fake services in parallel and concurrently with processing the migrating of the services.

12. The method of claim 11, wherein provisioning further includes monitoring actions of the intruders within the honey pot cloud processing environment.

13. The method of claim 12, wherein monitoring further includes correlating events associated with the actions to determine who the intruder is and what the intruder is attempting to do within the honey pot cloud processing environment.

14. The method of claim 13, wherein correlating further includes determining where the intruder came from.

15. The method of claim 13, wherein correlating further includes determining how the intruder penetrated the honey pot cloud processing environment.

16. The method of claim 11, wherein provisioning further includes feigning network traffic and resource names within the honey pot cloud processing environment.

17. The method of claim 11, wherein migrating further includes maintaining the honey pot cloud processing environment during and after the migration.

\* \* \* \* \*

UNITED STATES PATENT AND TRADEMARK OFFICE
CERTIFICATE OF CORRECTION

PATENT NO. : 9,894,098 B2  
APPLICATION NO. : 14/336794  
DATED : February 13, 2018  
INVENTOR(S) : Sabin Page 1 of 1

It is certified that error appears in the above-identified patent and that said Letters Patent is hereby corrected as shown below:

In the Claims

In Column 9, Line 57, in Claim 5, delete "Doman" and insert --Domain-- therefor

In Column 10, Line 4, in Claim 7, delete "fur" and insert --for-- therefor

Signed and Sealed this
Fourteenth Day of April, 2020

Andrei Iancu
*Director of the United States Patent and Trademark Office*